United States Patent
Lyadvinsky et al.

(10) Patent No.: US 7,937,612 B1
(45) Date of Patent: *May 3, 2011

(54) SYSTEM AND METHOD FOR ON-THE-FLY MIGRATION OF SERVER FROM BACKUP

(75) Inventors: Maxim V. Lyadvinsky, Moscow (RU);
Serguei M. Beloussov, Singapore (SG);
Maxim V. Tsypliaev, Moscow (RU);
Alexander G. Tormasov, Moscow (RU)

(73) Assignee: Acronis Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/780,679

(22) Filed: May 14, 2010

Related U.S. Application Data

(63) Continuation of application No. 11/679,943, filed on Feb. 28, 2007, now Pat. No. 7,721,138, which is a continuation-in-part of application No. 11/346,356, filed on Feb. 3, 2006, now Pat. No. 7,475,282, which is a continuation-in-part of application No. 11/022,887, filed on Dec. 28, 2004, now Pat. No. 7,353,355.

(51) Int. Cl.
*G06F 11/00* (2006.01)
(52) U.S. Cl. ............ 714/4; 714/6; 714/10; 714/13
(58) Field of Classification Search .................. None
See application file for complete search history.

(56) References Cited

U.S. PATENT DOCUMENTS

| 5,649,152 | A | 7/1997 | Ohran et al. | |
| 5,835,953 | A | 11/1998 | Ohran | |
| 6,665,815 | B1 | 12/2003 | Goldstein et al. | |
| 7,024,527 | B1 * | 4/2006 | Ohr | 711/161 |
| 7,334,157 | B1 * | 2/2008 | Graf et al. | 714/13 |

* cited by examiner

*Primary Examiner* — Yolanda L Wilson
(74) *Attorney, Agent, or Firm* — Bardmesser Law Group

(57) ABSTRACT

A system, method and computer program product for migrating a server include creating an image of a storage device of a first server; during execution of a boot loader on a second server, starting an initialization application that at least partially restores, to a storage device of the second server, operating system data from the image; analyzing a hardware configuration of the second server; modifying at least one driver of an operating system based on the analyzed hardware to enable the operating system of the second server to interface to the storage device of the second server; rebooting the second server using the at least partially restored operating system data; and restoring unaltered portions of remaining data from the image. The second server identification and/or authentication data stored on the image is updated before the rebooting. Identification data of the second server is at least partially replaced with corresponding data stored on the image. The image is unchanged until completion of the restoring step. The restoration step uses an incremental image of the storage device. A boot loader is started in case of failure of the first server.

20 Claims, 10 Drawing Sheets

SYSTEM AND METHOD FOR ON-THE-FLY MIGRATION OF SERVER FROM BACKUP

CROSS REFERENCE TO RELATED APPLICATIONS

This application is a continuation of U.S. patent application Ser. No. 11/679,943, filed Feb. 28, 2007, entitled SYSTEM AND METHOD FOR ON-THE-FLY MIGRATION OF SERVER FROM BACKUP, which is a continuation-in-part of U.S. patent application Ser. No. 11/346,356, filed Feb. 3, 2006, entitled SYSTEM AND METHOD FOR RAPID RESTORATION OF SERVER FROM BACKUP, which is a continuation-in-part of U.S. patent application Ser. No. 11/022,887, filed Dec. 28, 2004, entitled SYSTEM AND METHOD FOR RAPID RESTORATION OF SERVER FROM BACKUP, which are incorporated herein by reference in their entirety.

BACKGROUND OF THE INVENTION

1. Field of the Invention

The present invention is related to restoration of a computer system from backup, and more particularly, to a rapid restoration of a server from an image stored on a network. The present invention is also related to rapid restoration of local hard drives from a network, or from the Internet.

2. Related Art

With the popularity and success of the Internet, server technologies are of great commercial importance today. An individual server application typically executes on a single physical host computer, servicing client requests.

In conventional systems, the data of the server is typically backed up on some storage device in the form of backup files. If the server crashes or fails, or the software becomes corrupted, it may become necessary to restore the state of the server to some previously backed-up state. The process consists of three steps: (1) the machine is usually physically shut down; (2) the data is copied from the backup storage to the storage, e.g., disk drive, used by the server. During this operation, a dedicated boot procedure can be used (for example, boot from a floppy disk or CD ROM); and (3) the server is restarted.

During the restart time, the server does not perform any useful functions. Also, the process of restoring all the files of the server is time consuming. In corporate networks, a typical server can have 100 Gigabytes (or, frequently, much more than that) of data. With a transfer rate up to 100 Megabytes per second over a network, it would take approximately 1,000 seconds to transfer all the data from the backup storage to the server's local storage. This assumes that the entire network bandwidth is available for this process. Frequently, this is not the case, since only a fraction of the bandwidth may actually be available at any given time for restoring the files from backup. In practice, such transfers of data from backup to the server can take many hours.

Also, even 1,000 seconds of downtime is an extremely long time, particularly for many mission-critical applications. For example, if the server in question is a web server that handles customer requests or sales, a period of 16-20 minutes of downtime can result in substantial lost sales. Furthermore, it is generally believed that for many e-commerce applications, the consumer attention span is relatively short, and a customer who does not receive a rapid response from a web server will simply go to a competitor's website. In other words, there is a need in the art to minimize server downtime during backup, avoid network overloading during the restoration process, and to provide a mechanism to rapidly recover a server after a failure or shutdown.

SUMMARY OF THE INVENTION

Accordingly, the present invention is related to a system and method for on-the-fly restoration of a server from backup that substantially obviates one or more of the disadvantages of the related art.

In one aspect, there is provided a system, method and computer program product for migrating a server, including creating an image of a storage device of a first server; during execution of a boot loader on a second server, starting an initialization application that at least partially restores, to a storage device of the second server, operating system data from the image; analyzing a hardware configuration of the second server; modifying at least one driver of an operating system based on the analyzed hardware to enable the operating system of the second server to interface to the storage device of the second server; rebooting the second server using the at least partially restored operating system data; and restoring unaltered portions of remaining data from the image. The second server identification and/or authentication data stored on the image is updated before the rebooting. Identification data of the second server is at least partially replaced with corresponding data stored on the image. The image is unchanged until completion of the restoring step. The restoring is performed over a network. The image is created on the computing system connected to the server over a network. More than one storage device is restored from the image. The restoration step uses an incremental image of the storage device. A boot loader is started in case of failure of the first server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

The present invention is related to a utility for server backup that works on a data block level. The use of data block-based backup, rather than file-based backup, permits rapid restarting of the server from the backup data, usually referred to as an "image."

Figure 1:
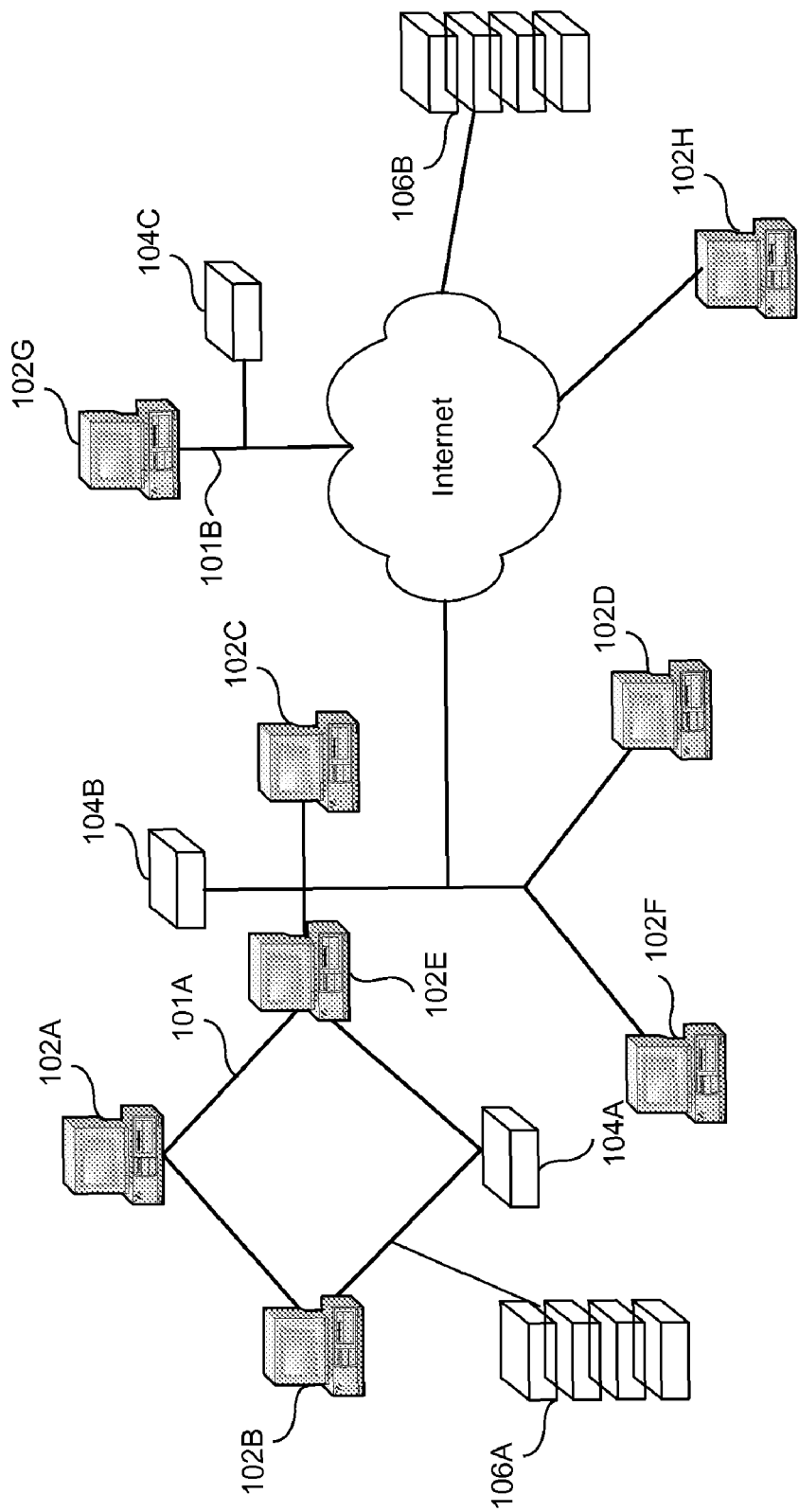
FIG. 1 illustrates an example of a network that may be used in the present invention.

FIG. 1 illustrates an example of a network that includes a server that needs to be restarted. Shown in FIG. 1 are a number of servers 102A-102H, connected to each other using such known means as a local area network (LAN) 101A, 101B, the Internet, a Wide Area Network (WAN), or some combination thereof. For purposes of this discussion, server 102A is used as an example of a main server that is being restarted. Also included in the network are storage elements 104A-104C and RAIDs (redundant arrays of independent disks) 106A, 106B.

Although in one embodiment the server 102A is the main server (e.g. server with a high level of accessibility), and the server 102B is the reserve server, it will be understood that the invention is not limited to this arrangement of servers, and 102B may be any server connected to the network that can replace the main server 102A. It may be a dedicated server used as a replacement server for a particular server or for any server in the group. The reserve server 102B may also perform some functions in an underloading mode, and the reserve server 102B may also be chosen from the group of servers in case the main server 102A fails. In this case, the reserve server 102B may be an underloaded server, a server working on tasks with lowest priority, etc.

The data of the main server 102A can be backed up on another server (e.g., reserve server 102B), or on a storage device, such as 104 or 106. Although in this discussion, the storage generally at issue is usually a hard disk drive, or HDD, it will be understood that the invention is not limited to that particular storage medium, but other storage media can be used for creating the image, such as tape, flash drive, optical drive, etc.

It should be noted that the present invention is less applicable for use with storage media that have sequential access, or for archiving on devices that use sequential access, such as tapes, although the invention is nonetheless applicable to this situation. In the case of storage devices that use sequential access, it is preferred to create an image on some intermediate carrier of information (or some storage device) that has random access capability.

The present invention is designed to restart the main server 102A directly from the backed up data (generally referred to as an "image"), without having to wait for the full transfer of the backed up data back to the local storage of the main server 102A, from some available network storage.

The backed up data can include a partition that relates to the operating system, or it can include data that the main server 102A uses for its operation, without which the main server 102A cannot perform useful activities, or both. Unused blocks and blocks with defects can be ignored when an archive is created, and are not restored in the future, when the restoration process takes place. For example, in the file system FAT32, this task is solved by an appropriate analysis of the FAT (File Allocation Table), and similar solutions can be applied to other file systems, such as FAT16, TFS, NTFS, EXT3 and XFS.

It should be noted that from the moment that the restoration of data from backup begins, whatever data exists on the server's own hard drive can no longer be considered valid. Note also that the backup may be a full backup, or it may also be an incremental snapshot of some of the files, etc. Generally, it is assumed that there is little point in doing an incremental backup or an incremental snapshot if doing the incremental backup is little different from doing a complete backup, since the overhead for doing incremental backup is higher than for a "regular" backup.

For purposes of the present discussion, it is assumed that whatever image exists in the backup storage, that image represents valid data, and that the server 102A, if restarted from that image, will function properly. For purposes of further explanation, it may be necessary to use not just the latest image, but some other image, which was created previously, if it is believed that the latest image does not represent valid data. Nonetheless, it is assumed that there is at least one image available somewhere that can be used for data restoration of the server 102A, and which represents valid data.

It should be noted that not only a copy or an archived copy of the disk of the main server 102A that is being restored can be used as an image, but any other disk can be used as well. For example, it is possible to swap the working contents of disk drives of working servers. Also, it is possible to duplicate servers, when the capabilities of the particular servers are inadequate to perform their assigned tasks due to overload.

For purposes of further illustration, the following describes the start up in a conventional operating system, for example, Windows NT. Using a BIOS (Basic Input/Output System), the hardware sends a request to a predefined data storage device (usually a local hard drive), which contains a Master Boot Record (MBR). The Master Boot Record in turn contains instructions for organizing the file system, loading the initial elements of the operating system into memory, etc. Then, device drivers are launched, and the operating system starts functioning, in the usual manner. For purposes of the present discussion, the problem is that the entire process described above with reference to the conventional operating system expects to find the data that it needs for startup at a certain spot on the local hard drive. The data that it finds at that predetermined location must be correct, and must be where the hardware expects to find it. If the Master Boot Record is "broken" (or contains errors) then the startup will fail. In other words, in order to launch the system (see, for example, U.S. Pat. No. 5,930,824, which is incorporated by reference), it is necessary first to copy, at a minimum, a set of data that is necessary for system start, from the image, onto the local hard drive. After that, the operating system is loaded into memory. Another difficulty that needs to be overcome is that the original image might not contain the means for an on-demand restoration of lost data from the original image. This makes it impossible, in some cases, to restore the hard drive from an image "as is."

The reduction in server downtime, and a significant simplification in the restoration procedure is accomplished by use of an MBR (master boot record), which ensures the completion of a loading procedure with the use of a special (dedicated, or modified) driver. The dedicated driver forms a virtual hard drive using an image of the restored disk and ensures addressing of applications to the virtual drive, which corresponds to the original (source) disk drive. Restoration of the disk sectors is on-demand, rather than by restoring the entire disk of the server 102A from an image. In other words, the order of the sector restoration is changed, or prioritized, to enable the server 102A to start up quickly, without waiting for the entire disk image to be transferred.

The first data that is copied from backup is the data that is necessary for the system to start up. At first, system start is used with utilization of special procedures, which are different from standard procedures used in the original drive. The operating system of the server 102A itself can determine which sectors are necessary. The operating system on the server 102A determines the priority of the on-demand restoration.

Upon startup of the server 102A, and once the initial code of the operating system is loaded, the operating system then can determine which sectors it needs next, and can restore those sectors at that time. The data is taken not from the local HDD, which contains presumptively invalid data, but from the image of the HDD. Also, the operating system keeps track of which disk sectors have been restored, and which have not. Subsequently, a utility is launched that will transfer the rest of the disk image according to its own set of priorities (e.g., priorities of the operating system or of the utility).

It is generally assumed that only a relatively small subset of the total data on the image is actually necessary to enable startup and (at least) initial functionality of the server 102A. The rest of the image can be transferred gradually over time, depending on the need for the data and the network resource availability.

In other words, this procedure enables a fast startup of the server 102A from a backup image, without having to wait for tens of minutes or even hours, for the entire image to be transferred. This means that the downtime of the server 102A is essentially not much more than the physical startup time of the server 102A (plus some additional, but relatively minor, time that it takes to copy the most critical parts of the image).

The amount of such critical startup data, in most modern servers, is generally on the order of about 100 MB or less, which means a transfer time on the order of 10-20 seconds. Note also that the 10-20 seconds needed for transferring the initial critical start up data can be in parallel with the actual physical startup of the server and initial operating system loading into memory. This further reduces the actual downtime experienced by the server 102A due to the restoration from backup.

Another advantage of this approach is that it permits online migration of a server with minimal downtime. For example, once the data is backed up, it can be used for startup of a different server (e.g., 102C), and the original server 102A can be shut down.

Also, in the case of online migration, the order of creating the disk image can be optimized and prioritized in the same manner, so as to enable startup of the second server 102C while the rest of the data is being migrated over time.

Figure 2:
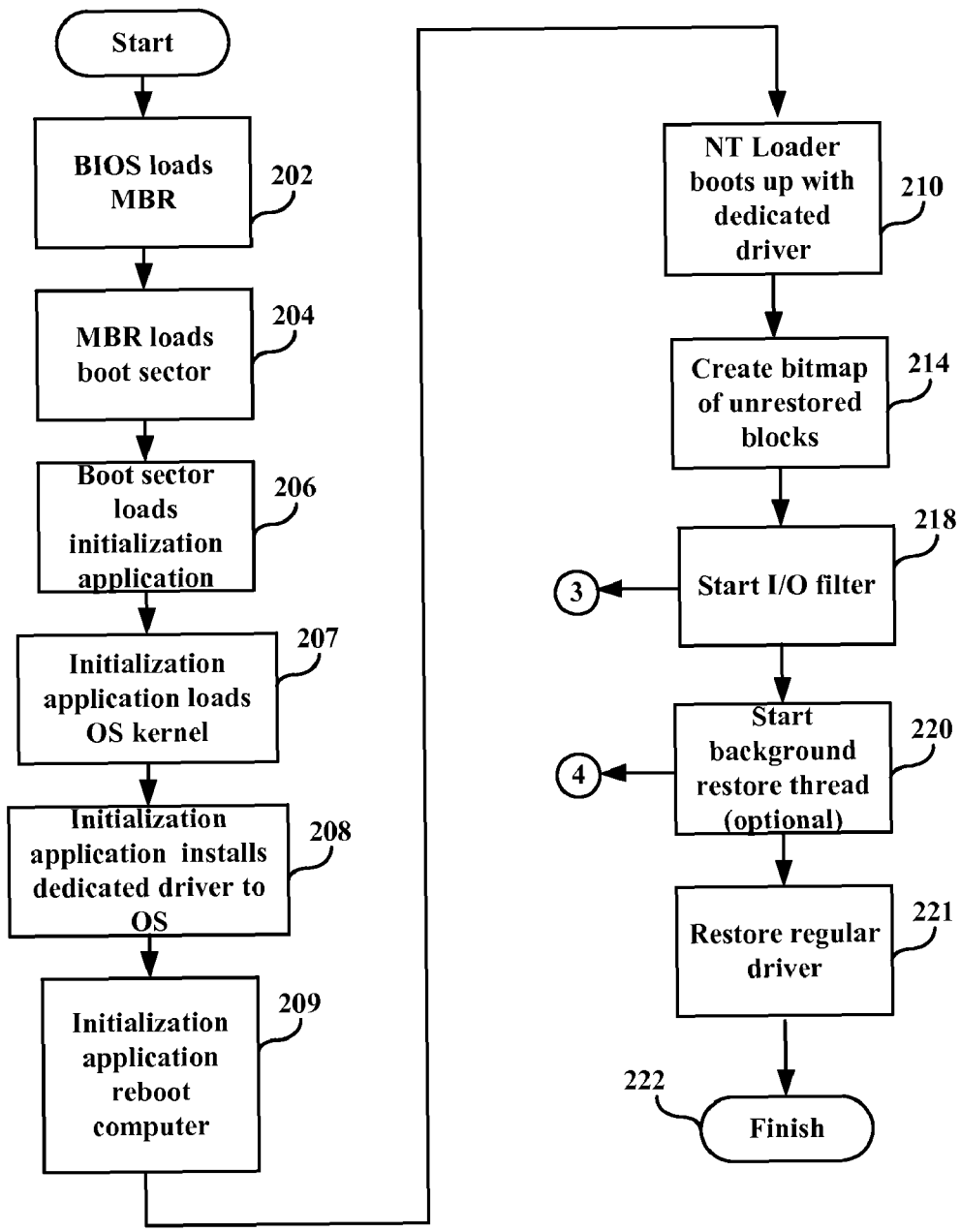
FIG. 2 illustrates one exemplary embodiment of the present invention.

FIG. 2 illustrates one embodiment of the present invention. Note that in FIG. 2, steps 218 and 220 also start asynchronous processes ③ and ④, illustrated in FIG. 3 and FIG. 4, respectively, that can run in parallel with the process shown in FIG. 2.

Before the storage device restoration can be done, an image of the storage device, e.g., of a disk drive, must be created. The image of the disk drive that have been backed up is created, for example, on a hard disk drive, or on another node on the network, or on another server, etc. Creation of a disk image generally means not merely copying of data from a "real" drive (which is later restored), but also formation of a disk which can be used as an image when the server or computer system is started (for example, a server or a desktop computer) that was previously not being used.

For example, if the server 102A had been previously shut down and is being restored, then the machine in question is the same physical machine. If the server in question is a server to which migration is being effected (102C in the above discussion), then the replaced Master Boot Record is loaded onto that physical machine. In other words, the machine being started up is the machine that corresponds to the virtual HDD.

For initial boot up procedure, a different partition of the same disk can be used, or a different storage device, for example, a network drive, such as a SAN (storage area network) disk, or NAS (network attached storage) disk. Also, the same physical disk drive can be used, on which an appropriate boot up area has been created. In the latter case, for replacing a disk, e.g., a damaged disk, or for restoration of a server on a new disk drive, the procedure can be done in a hot swapping regime, with the use of a disk on which a system boot-up area has been created. In the process of restoration, system information can be replaced with corresponding system information from the image.

An image of a partition can include all of the sectors of that partition, and also of operating system areas. The procedure that identifies disk sectors that are subject to archiving and, correspondingly, to a subsequent restoration through the use of a bitmap, should preferably be performed at the stage of creation of the archive.

As shown in FIG. 2, the dedicated driver is loaded to embed virtual storage drive (virtual HDD) into the operating system. This driver is then used when the computing system is rebooted and during operating system startup procedures.

For performing these operations, a bootable device with special MBR and/or boot sectors may be used to load a dedicated driver. Also, the "standard" OS driver may be modified, for example, by replacing or updating, or patching, the standard operating system driver before the reboot.

Additionally, executing the rebooting procedure with a dedicated driver can be performed by updating the BIOS settings in the memory of the restored server, e.g., for starting the server from the dedicated bootable device.

In step 202, the system on which the virtual HDD is to be mounted is booted up. Upon startup, the computing system's CPU runs the instruction located at the BIOS. It contains a jump instruction that transfers control to the location of the BIOS start-up program. This program initializes devices the computer will rely on during operation.

Then (step 204), the BIOS loads and executes the boot sector of the bootable device. In the case of a hard drive, this is referred to as the master boot record (MBR), which code in turn loads HDD sectors for further execution (step 206). In the preferred embodiment, the boot sector themselves, or in connection with additional sectors, may contain an initialization application or procedure, which can run in single thread mode since it has minimal functionality and in some cases does not require any operating system kernel for execution. In effect, the initialization application can be viewed as a substituted loader procedure (driver) that may be somewhat analogous to DOS programs that do not require an operating system kernel, or even an operating system, to run.

In step 207, the initialization application first copy to the disk operating system kernel data and optionally additional data required, for example, for initialization and starting computing system before hard disk driver can take effect. Then, in step 208, the initialization application or its subroutine is copied to the HDD dedicated driver, which then is used instead of the native disk driver of the operating system. In other words, for running the initialization application subsequent to startup and using the dedicated driver, such a driver, e.g., atapi.sys may be saved (step 208) to the local storage.

After completing those steps, computing system is ready for rebooting and may be rebooted by the initialization application (step 209) or manually by the user.

The initialization application transfers control to a routine defined by MBR (step 209) and restores boot sectors of the HDD, keeping in mind that the dedicated driver should be loaded instead of regular driver. As a result, the operating system then boots from the virtual HDD. Next, in step 210, the NT [WHY NT?] loader loads any boot drivers (for example, such as those used for the Windows NT or Windows XP operating systems) and the dedicated driver from the HDD.

It should be noted that BIOS' of most computing systems provide the possibility of assigning priority of bootable devices. In this case, it may be useful to provide correct booting and rebooting of the computer system in BIOS settings.

Step 210 of FIG. 2 implements the rebooting of the computing system analogous to steps 202-206 using restored parts of the boot sectors and operating system.

Note that the description herein regarding steps 202-210 is applicable to the Intel X86 architecture. Other processor architectures and operating systems have slightly different approaches, although the general principle is essentially the same, and are intended to be covered by this description.

Since the installed dedicated driver handles disk access requests, in one embodiment, by substituting a new interrupt handling routine for the standard one, the system will be able to use the virtual HDD. From the perspective of the hardware, the virtual HDD will be treated as if it were an integral local hard drive.

Moreover, through described mechanisms, a virtual storage device of the server 102A is created and, after rebooting of the computer system, all updates would be directed to that virtual storage device since the driver used to interface to the disk drive is updated accordingly. For example, if an ATAPI driver is originally used, that driver is updated to now refer to the appropriate virtual HDD, instead of the local HDD of the server 102A. This can be done, for example, by replacement of an appropriate atapi.sys driver in Microsoft Windows version in the backup image to a newer version, prior to rebooting the computing system and starting the restoration. The objective is to ensure that upon startup after rebooting, any disk access request is performed not directly on the local HDD, but through an intermediate procedure (and ultimately on the virtual HDD).

As an alternative to replacing the driver, a disk level filter can be added.

A disk level filter may be implemented as a separate module (essentially, a kernel mode driver) that is installed in addition to the standard disk driver and filters or intercepts all I/O requests passed to the low level disk driver. For example, the disk level filter may be layered in between the low-level disk driver, and the file system which sits above it. In some circumstances, this approach may be preferred, for performance reasons and is functionally equivalent to disk driver substitution. Similarly removing of the disk level filter is equivalent to restoring original disk driver.

The virtual HDD in some sense corresponds to the original HDD of the server 102A (or, optionally to only certain partitions of it). Another way to view this is that this procedure ensures that disk drive I/O is addressed correctly, to the virtual HDD rather than to the local HDD or some other "incorrect" storage device.

The local storage will receive the regular driver requests for access. The operating system boot up procedure is then redirected to the local drive. The backup image itself can also be modified to provide smooth access of the server OS that needs to be restored to the virtual HDD.

In step 214, a bitmap of the sectors of the virtual HDD that have to be restored is created. In other words, the bitmap represents which of the sectors have to be copied from the virtual HDD to the real local HDD, since the objective is not to merely start up the machine, but also to copy the image of the hard disk from the backup to the actual physical (local) HDD used by the server 102A. Using the bitmap, upon a disk access request, it is determined whether the particular sector that is being accessed has already been copied to the real hard drive or updated during operation of the computing system (and therefore can be used in local storage), or whether the corresponding sector is still located on the backup device, in the virtual HDD, and therefore still needs to be copied. The access can be executed using a storage area network, a local area network or any other mechanism available for accessing remote storage. Since the dedicated driver is now resident in the memory, corresponding blocks of the image should be marked in the bitmap for complete restoration of the storage device. It should be noted that the bitmap is required for disk restoration and may be created not only after rebooting the computing system, but even before this step.

Figure 3:
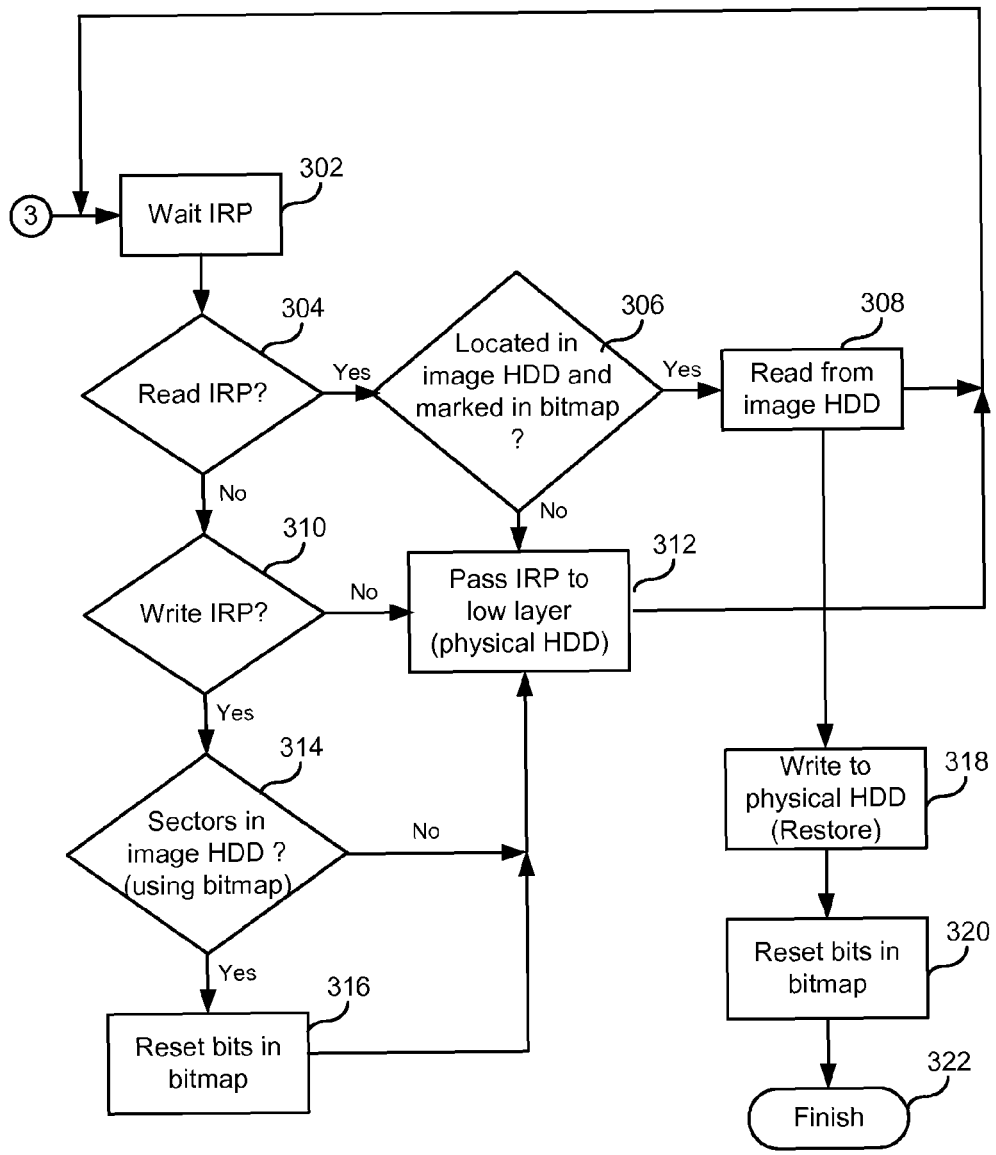
FIGS. 3-4 illustrate additional detail of asynchronous data copying.

Step 218 starts asynchronous process ③, which is illustrated in FIG. 3, and which determines which I/O devices, physical devices, such as disk drives, disk partitions, logical drives or logical partitions, or their combinations, need to be accessed. Applications address the virtual HDD as a single address space, although the processing of the requests may require readdressing of the requests to either the disk being restored or the disk image, based on the procedures discussed below.

Figure 4:
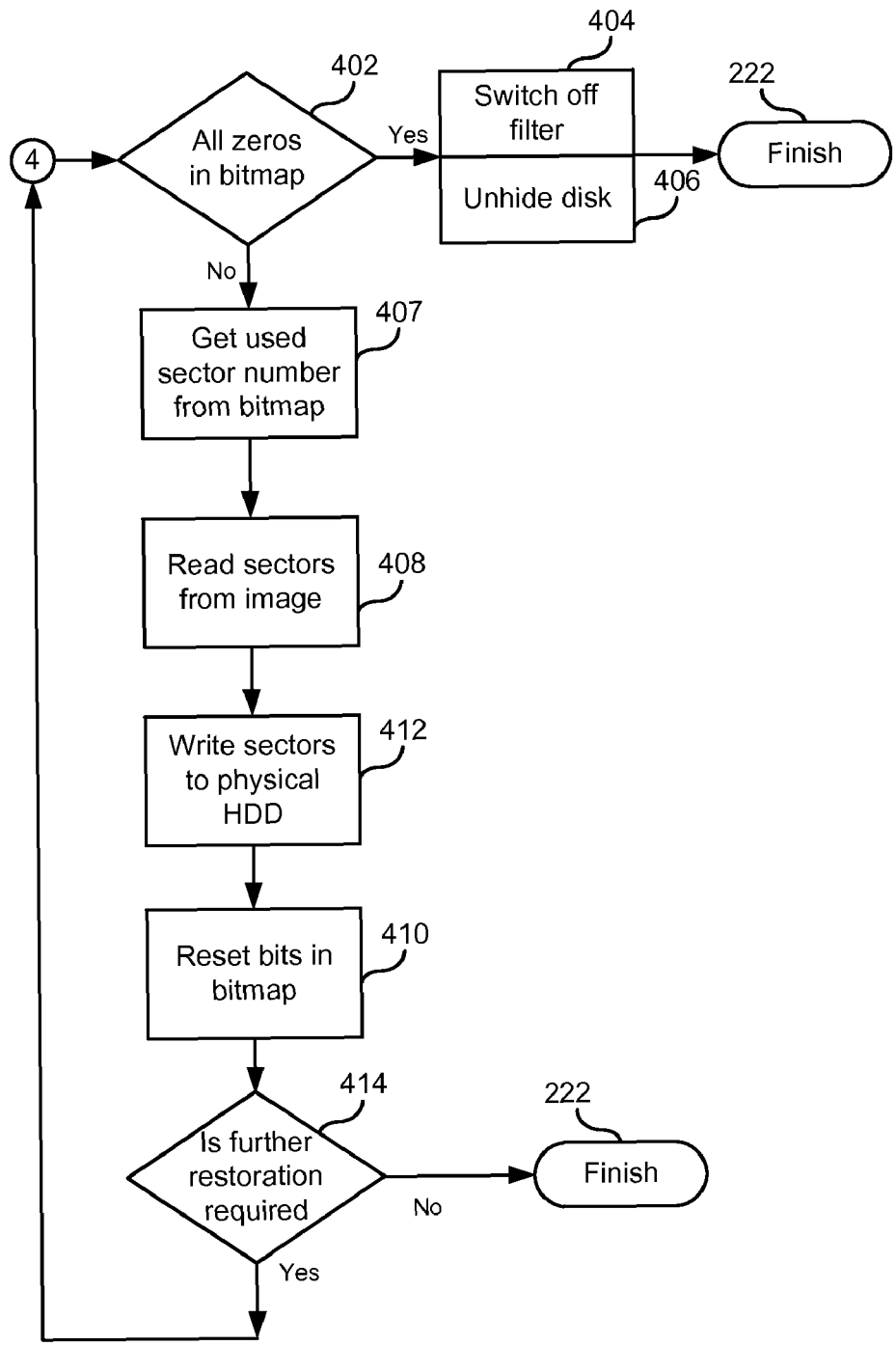

Also, an asynchronous restore thread is started in step 220, which is illustrated in FIG. 4 and is designated by ④. The process then finishes (step 222). Note also that after step 214 execution, the existence of the local HDD has been hidden from the operating system. Thus, all disk access requests go to the virtual HDD. This is done to avoid a situation where there are two storage elements that contain "actual" data, and which in theory could conflict with each other.

After finishing processes ③ and ④, the dedicated driver may be restored, or may be replaced by the regular (standard) operating system driver, e.g., for direct access of the corresponding memory, or the system may be restarted by the standard procedure from the restored drive.

FIG. 3 illustrates the process of accessing data from a virtual HDD. As shown in FIG. 3, an interrupt request packet (IRP) is received. In step 304, the IRP is processed. Note that the IRP is a Windows operating system concept. More generally, in the context of other operating systems, it may be thought of as a request for a read/write operation, in this case involving storage.

If the IRP is a READ request (READ IRP), then, in step 306, the system checks whether the sector being accessed can be located on the image HDD using the bitmap. If it can be located on the image HDD, then, in step 308 the sector is read from the image HDD. If it cannot be located on the image HDD, then in step 312, the IRP is passed on to a lower hardware layer (in other words to the physical HDD). Note that physical disk at issue here can be a logical construct, for example, software or hardware-supported RAID partition, disk image in a file or an encrypted disk image.

If, in step 310, the IRP is neither a READ or a WRITE IRP, then the IRP is passed to the lower layer (the physical or local HDD) in step 212. Examples of IRPs that are neither READs nor WRITEs are, for example, Get Disk Layout IRP's in Microsoft Windows. If the IRP is a WRITE IRP, then the process checks, in step 314, whether the sectors being accessed are in the image HDD. If not, then the IRP is passed to the lower layer, as in step 312. If it is in the image HDD and has not been restored previously, then the appropriate bits in the bitmap are reset, with blocks (clusters) being unmarked (step 316). In other words, if the READ IRP is directed to a sector that is currently located on the image HDD, the sector is copied from the image HDD to the real local HDD, and the data is actually read from the local HDD. As an alternative, the data can be copied into a cache, and read from the cache. Thus, in step 316, the system recognizes that it does not need to access the image HDD since the data is already present on a local hard drive. The process then proceeds to step 312.

Also, steps 318-322 characterize restoration of blocks that have been read from the image. The process includes writing corresponding blocks to local storage (physical HDD) (step 318), resetting corresponding bits in the bitmap (unmarking block) (step 320), and finishing after the last operation has being completed.

It should be noted that the bitmap should be maintained in a state that is consistent with the actual state of the HDD. It is the responsibility of the various processes that use the bitmap to ensure that the information in the bitmap is accurate, consistent and up to date (e.g., by freezing the processes that change the state of the HDD while the bitmap is being updated, or utilizing a special set of marks, etc.).

Another asynchronous process ④, illustrated in FIG. 4, handles the gradual (background) copying of the data from the virtual HDD to the local HDD. As shown in FIG. 4, the asynchronous process ④ first checks if the bitmap contains all zeros (step 402). If it does, then the I/O filter is switched off (step 404) and restoration procedure has been finished. Optionally, the local HDD is unhidden (step 406) and the asynchronous process ③ finishes. In other words, from this point forward, now that all the required data has been copied from the virtual HDD to the local HDD, the disk access can be to the local HDD, instead of the virtual HDD. The background process of the restoration can be executed in the absence of input/output operations and/or release of transmission channels.

Otherwise, the driver discussed with reference to bitmap initially created in step 218 performs the functions illustrated in FIG. 3.

If the bitmap has some marks, e.g., 1's (i.e., any sectors that are marked), then used sector number is read from the bitmap (step 407), and the corresponding sectors are gradually read from the virtual HDD (step 408). The corresponding bits in the bitmap are reset (step 410). The sectors are written to the local HDD (step 412). The process then cycles until all of the demanded sectors are copied, i.e., no marks (no 1's) in the bitmap are left.

Upon execution of the asynchronous processes of FIGS. 3 and 4, the system continues to function as if it has always functioned with the local HDD.

Furthermore, it will be appreciated that the background process illustrated in FIG. 4 can also be prioritized before it begins. In other words, it may be decided, a priori, that some of the sectors have higher priority than others, in the copying process. For example, certain applications' data, which are frequently used, may be copied first. Also, some databases, which are frequently used, may be copied before others. Other mechanisms known in the art may be employed for structuring the priority of each sector during the background copying process ④. For example, unrestored files of file groups that had been accessed in the previous N processor cycles (or minutes, or hours) may be restored before files of those file groups that had not been accessed for some predetermined period of time. Those file groups may be database file structures or whole folders accessed by the applications.

Figure 5:
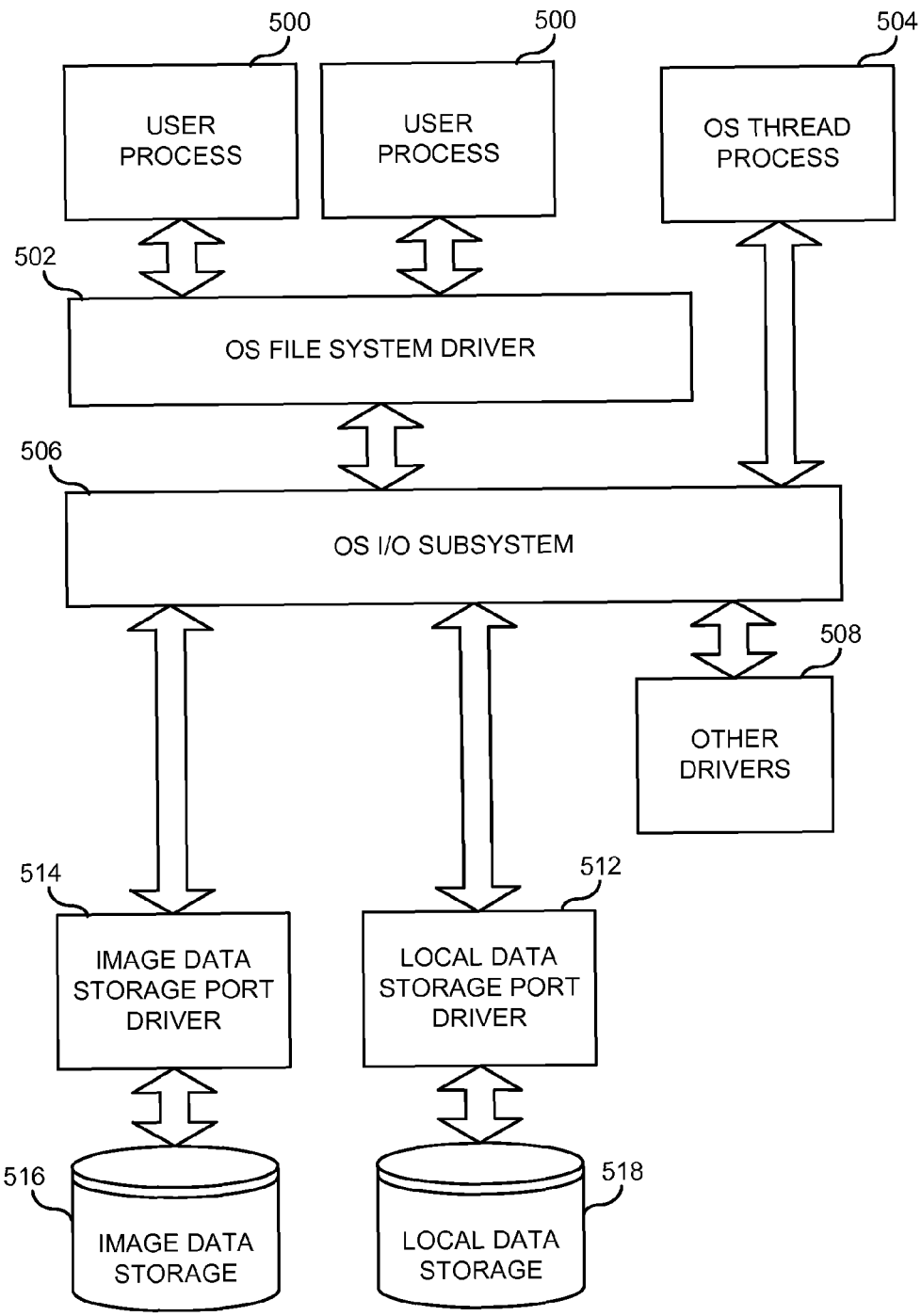
FIG. 5 illustrates an example of a data processing model during storage device restoration.

FIG. 5 is an illustration showing a computing system having a restoration procedure, in accordance with an embodiment of the present invention.

The computing system includes user processes 500 executing in an OS environment having a file system driver 502. Also, one or more OS thread processes 504 may be executed in parallel with user processes. An OS I/O subsystem 506 is in communication with the file system driver 502. The I/O subsystem 506 uses a class driver to manage and deliver I/O requests to device drivers 508 and 510, that provide communication to corresponding devices: I/O ports (not shown), local area network controllers, image storage 516, local data storage 518 (flash or hard disk drives), etc.

Also, requests to local storage are managed during the restoration procedure by means of a dedicated driver (virtual storage driver) 512 that addresses data, corresponding to requests via corresponding storage ports by use of storage port drivers selected by the result of bitmap checking.

Image storage 516 and local data storage 518 are hidden from the I/O subsystem 506 as physical drives, and their content is accessed by the I/O subsystem 506 as having an integral (unified) address space (including handling any issues with access requests for non-existent data). Also the image storage 516, during restoration procedure, may be accessed for read only access, while the local data storage 518 is random access storage.

After completion of the restoration procedure and removal of the virtual storage driver from the OS, the I/O subsystem 506 manages requests to local data storage 518, and, if needed, to the image storage 516 directly by means of image port driver 514 and local port driver 512.

Figure 6:
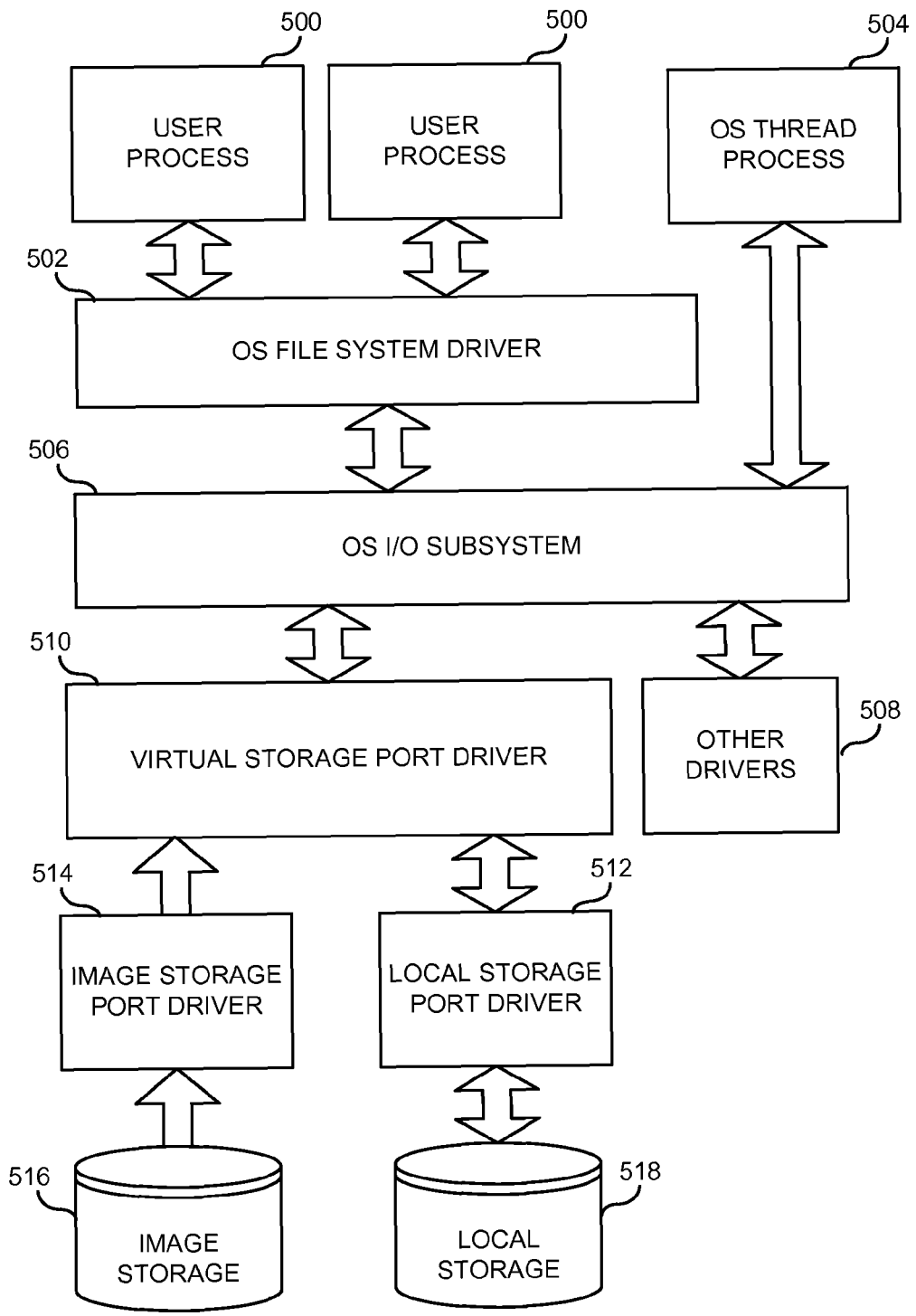
FIG. 6 illustrates an example of a data processing model after completing a storage device restoration procedure.

FIG. 6 [LOOKS IDENTICAL TO FIG. 5??] illustrates an example of a data processing model after the storage device restoration procedure is finished. Note particularly virtual storage port driver 510, which is used to intercept access requests to the standard drivers 512, 514 normally used by the operating system, as well as for organizing the virtual HDD (shown as a single structure, though it may actually be multiple storage elements). Once the restoration process is complete, the driver 510 is removed from the system. As a result, the local data storage 518 and the image storage 516 (e.g. network storage), after removal of the driver 510, are recognized by the operating system as distinct storage elements. Therefore, access requests to these devices are also processed based on standard procedures. At the same time, the restored local data storage 518 can be used in the same manner as virtual storage, while the image data storage 516, after removal of the driver 510, can then be maintained as a new storage element, or can stay hidden.

An alternative embodiment of the invention relates to not just backup and restoration of the same server, but also to server migration. For example, the server may experience technical difficulties, or may need to be taken offline rapidly, for some reason, or may need to be taken offline for regularly scheduled maintenance. In this case, continuity of service to users, and prevention of service interruptions, is an important factor in data center operations. In this scenario, the image that is maintained of the server's hard drive can be used to migrate the server on-the-fly to a different physical machine. The image may be an incremental image, or a full image. Also, the image may be one that is continuously updated (incrementally or otherwise), particularly where the activities of the server are regarded as mission critical. In this case, when the server needs to be migrated on-the-fly, the image is restored to a different physical machine.

One aspect that needs to be addressed is the possibility of the hardware configuration of the target machine being different from the hardware configuration of the source machine, in this on-the-fly migration scenario. For example, the network card of the target machine may be different, the hard disk drive interface may be different (for example, the source machine might be using an IDE drive while the target machine is using SCSI, or ULTRA-ATA drive). Thus, on-the-fly migration needs to involve not only nearly copying the data to the local drive of the target machine, but also the replacement of the relevant drivers, so that the OS drivers match the hardware configuration of the target machine. Once the drivers are replaced in the image, the operating system is reloaded on the target machine.

Note that some software expects to work with a particular hardware configuration, for example, some software might be particularly oriented towards working with a SCSI drive. In this case, mere replacement of a SCSI driver with a different driver will likely cause that software program to fail. In this case, the device (and the driver) would need to be emulated. Note also that the same process of on-the-fly migration back to the original server can be implemented in the manner, once the technical difficulties with the original server are resolved.

Also, the approach described herein can be used for creation of a virtual server farm of multiple essentially identical servers. The organizational aspects of such a virtual server farm are handled at a higher level of organization—the point is that such a method as described herein can be used to create "ready-made" hardware nodes, which can be easily replicated on-the-fly, regardless of the hardware configurations of the individual nodes, and added to or removed from the virtual server farm.

The network can be a common network, e.g., a LAN, without any particularly stringent performance requirements.

As an example, a local area network (LAN) connects a main server 102A, a reserve server 102B and optionally a storage area. The main server 102A may by any type of server performing hosting services, mail services or the like. In a common case, the main server 102A has no minor and the main server 102A fails and is unavailable to users or other servers.

To provide for restoration of the main server functions, the main server 102A content should be backed up on the storage device in some cases on the same main server 102A (in case when the content of the storage device may be available over a network even when the main server 102A fails, etc.) available over a network, and suitable for server substitution, e.g., as a reserve server 102B. Backing up may be performed in any manner, e.g., in form of incremental backup, or as a persistent (online) backup, when all changes in the main server 102A content are backed up continuously. As an alternative periodic backup may be performed under a scheduling algorithm.

The main server 102A often performs functions that are mission-critical, and should be performed even the first server fails. The main server 102A can fail for different reasons, e.g., hardware or software failure, required replacement of a hard disk drive, etc. Thus, if the main server 102A crashes or fails, it becomes necessary to support the services the main server 102A through the network.

The reserve server 102B can be started up using the backup files of the main server 102A without downtime or with minimal downtime. The restoration of the reserve server 102B can be performed using online data migration. Also, the main server 102A can start up after a full restoration from the backup.

There is also a possibility of the hardware configuration of the reserve server 102B being different from the hardware configuration of the main server 102A. Therefore, online data migration includes the replacement of the relevant drivers, so that the operating system drivers match the hardware configuration of the reserve server 102B. Once the drivers are replaced in the backup files, the operating system is reloaded on the reserve server 102B.

Figure 7:
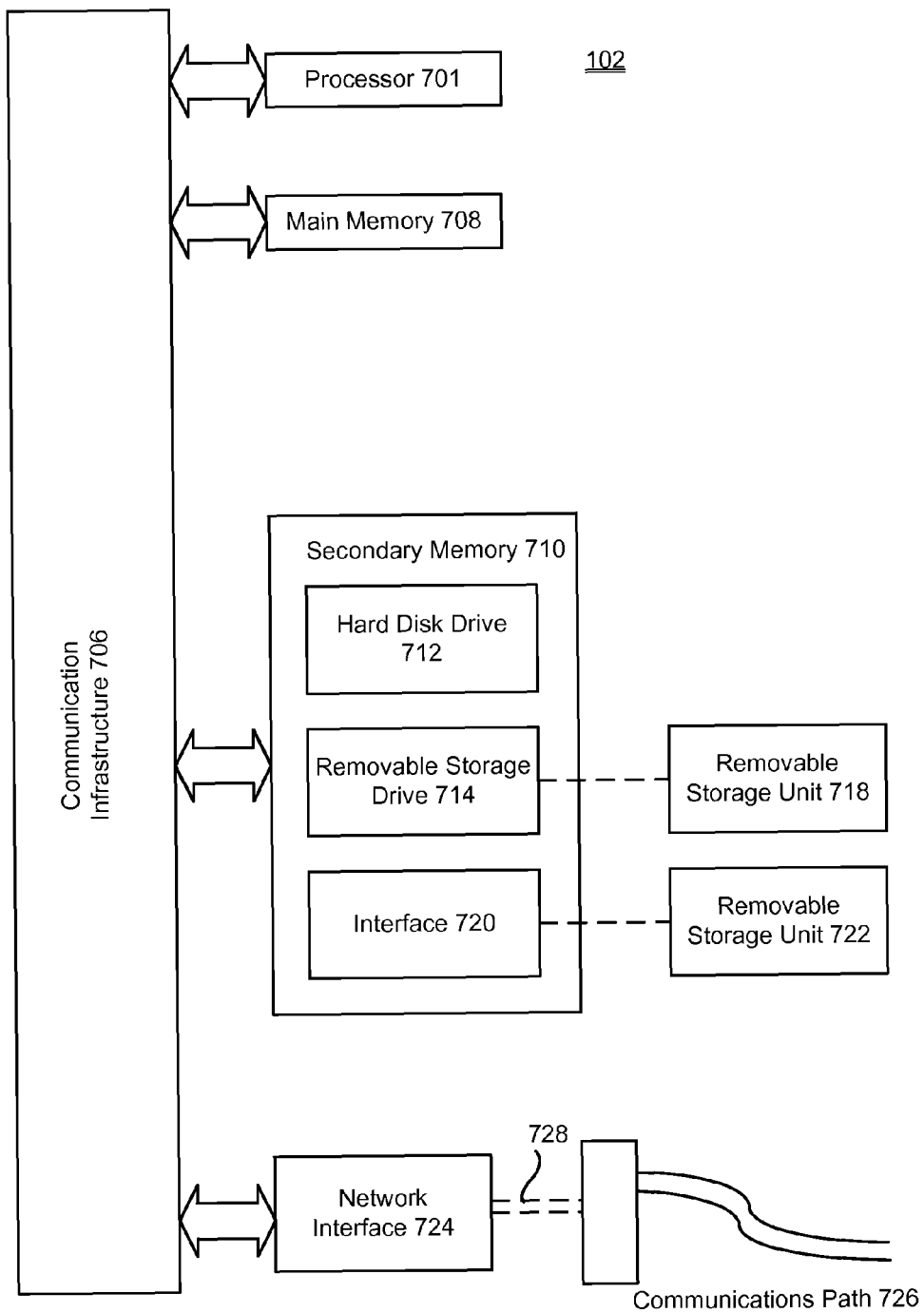
FIG. 7 illustrates an example of a server that may be used in the invention.

FIG. 7 illustrates an example of the server 102. The server 102 includes one or more processors, such as processor 701. The processor 701 is connected to a communication infrastructure 706, such as a bus or network. Various software implementations are described in terms of this exemplary computer system. After reading this description, it will become apparent to a person skilled in the relevant art how to implement the invention using other computer systems and/or computer architectures.

Server 102 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718 represents a magnetic tape, optical disk, or other storage medium that is read by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into server 102. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to server 102.

Server 102 may also include one or more communications interfaces, such as communications interface 724. Communications interface 724 allows software and data to be transferred between server 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 701. Information representing processed packets can also be sent in the form of signals 728 from processor 701 through communications path 726.

The terms "computer program medium" and "computer usable medium" are used to generally refer to media such as removable storage units 718 and 722, a hard disk installed in hard disk drive 712, and signals 728, which provide software to the server 102.

Computer programs are stored in main memory 708 and/or secondary memory 710. Computer programs may also be received via communications interface 724. Such computer programs, when executed, enable the server 102 to implement the present invention as discussed herein. In particular, the computer programs, when executed, enable the processor 701 to implement the present invention. Where the invention is implemented using software, the software may be stored in a computer program product and loaded into server 102 using removable storage drive 714, hard drive 712 or communications interface 724.

Figure 8:
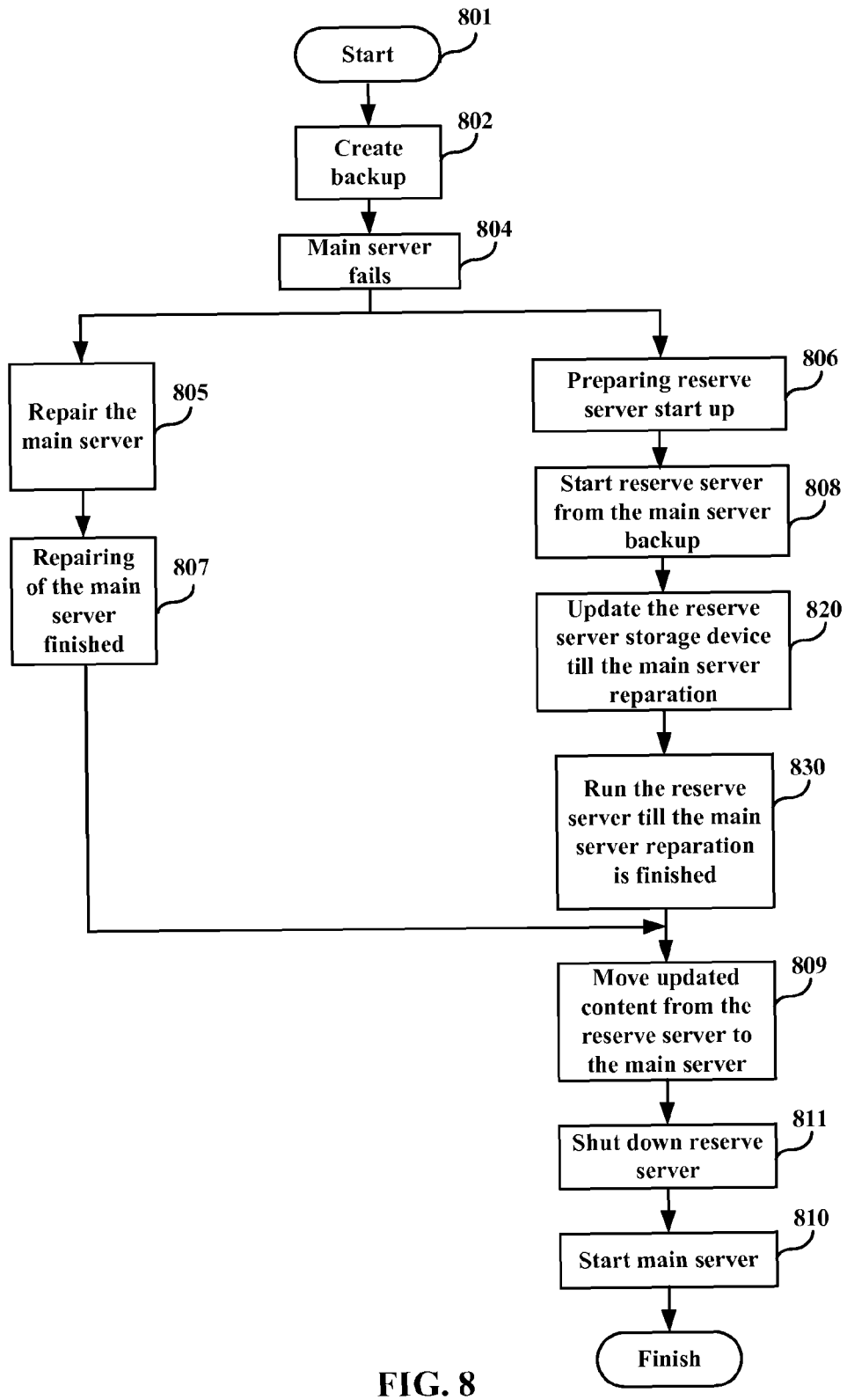
FIG. 8 is a flow diagram illustrating an algorithm of an exemplary embodiment.

FIG. 8 is a flowchart illustrating steps an exemplary method for on-the-fly restoration of a server.

After starting (801), back up of the main server 102A needs to be provided. This process is shown in step 802. In step 804, the main server 102A fails. From this point forward, the main server 102A is not operational, and should be repaired (step 805). In step 806, the reserve server 102B is prepared to start, instead of the main server 102A, using backed up content of the main server 102A. This process may need an adaptation operating system, previously installed on the main server 102A, to the reserve server 102B hardware requirements.

In one embodiment, the reserve server 102B executes a boot up procedure (step 808). One example of such a restoration is described above. At least a portion of the operating system previously installed on the main server 102A is restored on the reserve server 102B, to provide for its operability, so the reserve server could be rebooted if required and starts to work with the image of the main server 102A. The operating system restored on the reserve server 102B itself can determine which sectors are necessary. The operating system on the server 102A determines the priority of the on-demand restoration. Upon startup of the reserve server 102B, and once the initial code of the operating system is loaded, the operating system then can determine which sectors it needs next, and can restore those sectors at that time.

Note that the hardware configuration may differ from one server to another, and the operating system should be updated. To this end, the hardware is analyzed or the reserve server 102B administrator indicates which hardware devices are installed on the server 102B, and then corresponding drivers and settings for those devices compatible with operating system of the main server 102A are installed. Detection of the hardware device and an installation of the corresponding driver may be performed one at a time for each device. Also, some devices may be recognized by software and others indicated by operator or server administrator.

When all the software required for certain hardware configuration is installed, the reserve server 102B may be rebooted if required and starts to work with the image of the main server 102A as if it were a local drive or a real networked drive.

From this point forward, online data migration from the image to the reserve server 102B may be performed, e.g., to improve reserve server 102B performance. This data may be the entire image content or just predefined structures frequently required while the reserve server 102B is in operation. Also, only requested data may be restored on the reserve server 102B. A full restoration of the reserve server 102B from the backup is not required, since the reserve server 102B is expected to be a temporary server in most cases, until the main server 102A hardware has been repaired. The updated content of the reserve server 102B should be saved and made available over the network in any form.

After repairing hardware or critical software of the main server 102A, the updated content of the reserve server 102B can be migrated to the main server 102A, along with restoring unchanged content from the backup (step 809). In step 810 the main server 102A can operate again. The advantage of this method is that switching to the reserve server 102B is transparent to the user, and no data is lost. After that, the reserve server 102B can be shut down or return to performance of its usual duties (step 811).

Figure 9:
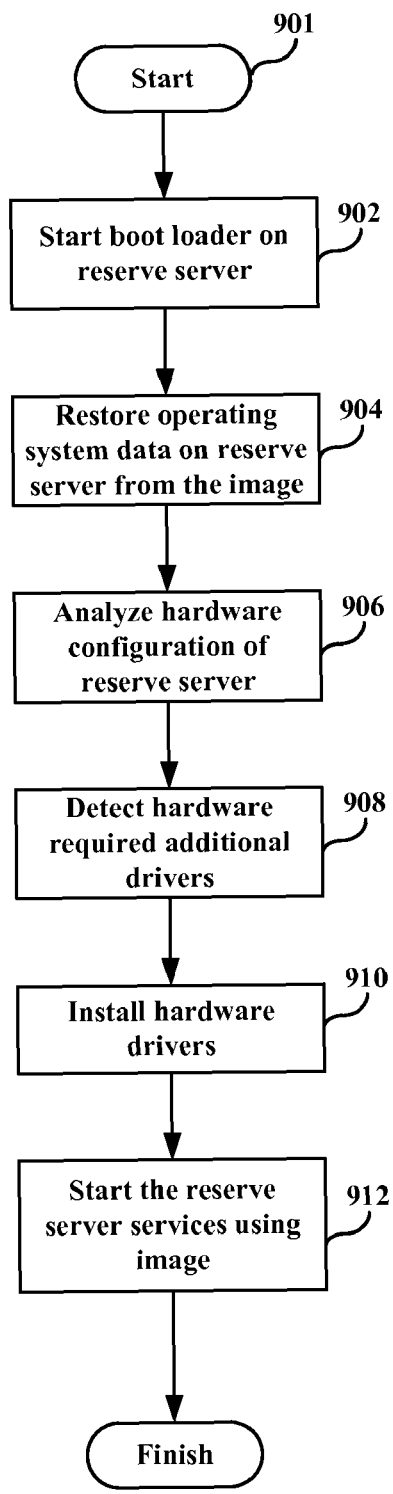
FIG. 9 illustrates an exemplary embodiment of a method for online data migration.

FIG. 9 illustrates one embodiment of a method for online data migration. The backup of the storage device of the main server 102A must be created on any storage device. If the main server 102A crashes or fails, the reserve server 102B can be started up using the minimal data from backup files of the main server 102A, and can be restored to a different physical machine (e.g., the reserve server 102B itself) without downtime or with minimal downtime.

Also, reserve server 102B can be supported by virtualization technology, such as Virtual Machine (VM) technology in case of other types of failures, e.g., critical failure of operating system, etc. (i.e., the virtual machine still can work on the main server 102A).

After start (step 901), the system of the reserve server 102B is booted up (step 902). The OS and the necessary drivers available to the operating system are installed on the reserve server 102B from the backup (step 904). During boot procedure execution on the reserve server 102B, minimal data migration from backup storage to the reserve server 102B is needed. The operating system data from the backup files is partially restored to the storage device of the reserve server 102B and the restoration of the reserve server 102B is performed using an online data migration.

It should be noted that the reserve server 102B may be used as a temporary server to be restarted further on the main server 102A after its reparation. In this case it is of no use to migrate data of the main server 102A to the reserve server 102B completely to increase network performance. In this case, a predefined set of data may be stored locally on the reserve server 102B and other data may stay available in the backup storage. Data stored on the reserve server 102B may be some system data or data requested from the backup while operations of the reserve server 102B or newly written or changed data, etc. or some combination thereof.

The hardware configuration of the reserve server 102B is analyzed (step 906), as there may be differences between the hardware configuration of the main server 102A and the reserve server 102B. For example, a chipset configuration or the network card of the reserve server 102B may be different. Therefore, the online data migration needs to involve not only copying the data to the local drive of the reserve server 102B, but also the replacement or updating of the relevant drivers. Therefore, there is a need to detect hardware required additional drivers (step 908) and install hardware drivers (step 910). Consequently operating system of the main server 102A is updated to match the hardware configuration of the reserve server 102B and the reserve server 102B starts using the restored operating system (step 912).

Figure 10:
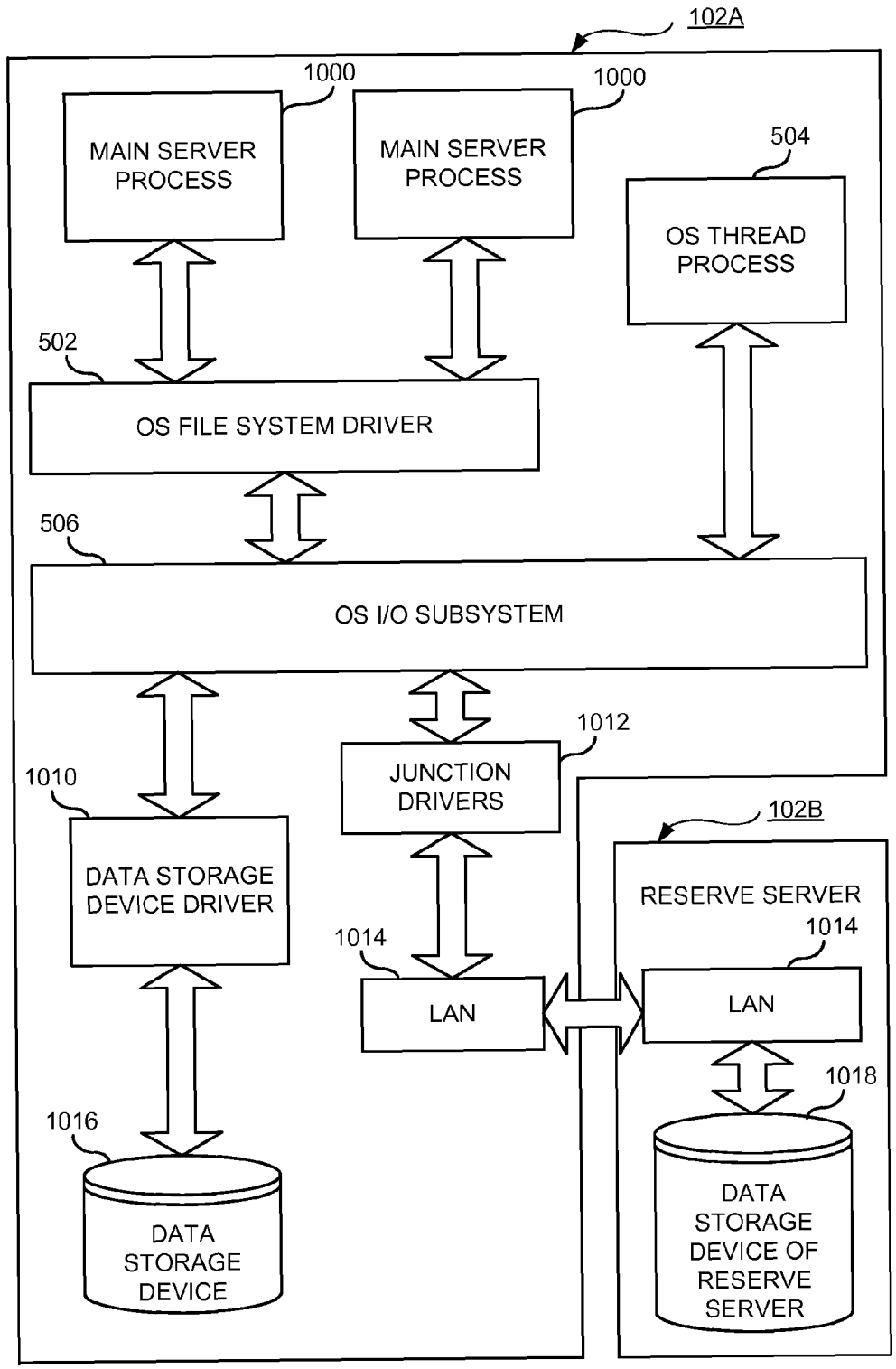
FIG. 10 illustrates an example of a data processing model during online data migration.

FIG. 10 is an illustration showing a computing system having online main server 102A restoration after the main server 102A repair has been finished.

The computing system includes the main server 102A, the reserve server 102B with storage device 104A. Also, the storage device may be installed on other server, where contents of the reserve server 102B was backed up.

The process of the restoration of the main server 102A is one example of the online data migration with minimal downtime, except for the restoration of updated data of the reserve server 102B on the main server 102A.

The I/O subsystem 506 uses a class driver to manage and deliver I/O requests to junction drivers 1012 and data storage device driver 1010 that provide communication to corresponding devices: I/O ports (not shown), local area network controllers 1014, data storage device 1016, data storage device 1018 of the reserve server 102B, etc. Local area network controllers 1014 allows to connect the main server 102A to the reserve server 102B and data storage devices with backed up main server 102A data. Junction drivers 1012 are used for merging data from main server 102A data device storage 1016, reserve server data device storage 1018 and extra data device storage connected to this computing system via local area network controllers 1014. The reserve server 102B data device storage 1018, during the restoration of the main server 102A, may be accessed for read only access, while the data storage device 1016 is random access storage. WHAT IS 1001 IN FIG. 10?

After the main server 102A repair, the online operation the main server 102A restoration can be started. It is necessary to create the snapshot of the reserve server 102B. One example of creating snapshot is stopping writing data on the data storage of reserve server 102B and using frozen content as a source of data. Also, not only data are migrated from the reserve server 102B to the main server 102A during its restoration, but also memory pages of the reserve server 102B.

Also, in case of the main server 102A crashing, it is not always possible to provide complete hibernation. Some information in a transfer process can be lost during the continuous backup of the main server state onto storage devices. During restoration of the main server 102A from the reserve server 102B is realized the memory pages migration from the reserve server 102B to the main server 102A for improving system stability. UNCLEAR!!!

After the snapshot creation is completed, the main server 102A is prepared to start, instead of the reserve server 102B, using the snapshot of the reserve server 102B. The operating system data from the backup files is partially restored to the storage device of the main server 102A and the restoration of the main server 102B is performed using an online data migration.

The hardware configuration of the main server 102A is analyzed, as there may be differences between the hardware configuration of the main server 102A and the reserve server 102B. Therefore, the online data migration needs to involve not only copying the data to the local drive of the main server 102A, but also the replacement or updating of the relevant drivers. Therefore, there is a need to detect required junction drivers (1012). [EXPLAIN WHAT THESE ARE] Junction drivers are necessary for merging different device storages as the united device storage. Then data from different device storages can be used for restoring the main server 102A much more quickly without loss of significant information. Note that junction driver updating is an optional process, since hardware configuration of the main server is updated in a previous process, but not replaced, so previous backups may also be optionally used. Also for process of the restoration is provided by this invention, as a common need, those junction drivers are depending on hardware configuration differences (as it shown below). UNCLEAR The data storage device for the main server 102A restoration may be a previously described combination of local drive and the image, or an additional image on another drive may be used for restoration.

Also, blocks are located on the reserve server 102B storage device with all new changes that took place during the working session on the reserve server 102B and the backup of the main server 102A on any device storage may consider as analogue of the single local drive and can be used for online main server 102A restoration. In most commonly encountered cases, some blocks stored in the backup are identical to blocks of the server's own hard drive data. So this data haven't to restore with the exception of errors in its or it is necessary to restore old data or unnecessary changes in its and etc. [UNCLEAR]

Consequently the operating system of the reserve server 102B restored on the main server 102A is updated to match the hardware configuration of the main server 102A and the main server 102A starts using the restored operating system. Note that the hardware configuration of the main server 102A should not be necessarily fully updated. It is necessary to update only main server 102A drivers of devices is differing from reserve server 102B drivers on the snapshot or from main server 102A drivers on former backup. If main server's 102A former backup contains all necessary information for main server 102A operating system restoration, or the hardware configuration of the main server 102A and the reserve server 102B is the same, main server device drivers do not necessary need to be updated.

After main server 102A restore is started, to reduce traffic between the data storage device (including data storage device of reserve server 102B and any data storage devices connected by LAN) and main server 102A information from main server 102A data storage device may be used. Necessary information is determined by additional applications, such application based on MFT comparison.

After the main server 102A booted up the operating system restored on the main server 102A itself can determine which sectors are necessary. The operating system on the main server 102A determines the priority of the restoration. Upon startup of the main server 102A, and once the initial code of the operating system is loaded, the operating system then can determine which sectors it needs next, using a snapshot created on the reserve server 102B to update old information on the main server 102A.

The restoration step uses an incremental image of the storage device. The original archive is updated with incremental backups that reflect all the changes that took place during the working session. A complete session backup, represented by a set of incremental backups that took place during the session, permits recovery of the portion of the disk or the file system as they existed at various points in time. So identifiers must be specified for mounting (i.e., making accessible) a correct image to indicate proper increments in the image. Such identifiers can use time stamps of the backup. In this case, increments corresponding to the backup version should be handled simultaneously with the initial snapshot.

Multiple restoration points allow to restore the main server 102A from backed up data of the server, if the server crashes or fails due to its settings before or during of fails, so the server restoration can be performed relative to any point in time.

The present invention loads critical portions of the backed up operating system quickly, in order to enable the server to boot up directly from the backed up data, to minimize server downtime. It will be appreciated that the present invention may be used not only for restarting a server, but also for online data migration. The server that is being restarted need not be the same server, but may be any server connected to the network.

It should be noted that a computer system to which the invention is applicable can include, for example, a desktop computer, a portion of whose disk drive is restored either from a different portion of the same local drive, from a different drive, from a network drive, etc. The computing system can also be a distributed computing system; a server that requires restoration or replacement of its disk drive after a critical failure; a server that is being brought online to replace or a server that has failed; or a server that is duplicating functions of another server, for instance, when that server is inadequate for the expected load.

The term "unexecutable requests" refers to requests that cannot be fulfilled by accessing the disk drive being restored. This is distinct from attempting to read or write to non-existent files, which is an operating system I/O issue. The read request is generally treated by operating system as being unexecutable if the corresponding block of the local drive is either corrupted or unrestorable.

It should also be noted that copying of data from the image to the computer system is not limited to mere transfer of the data. In this context, such copying should be thought of as reading of the data from the image and transferring the data to the computing system, including possible caching. Also, the "remainder of the storage device" (unaltered portions of remaining data) that can be restored from the image as a background process refers to all data in the image, except for the data and the sectors whose content has been changed during the process of execution of the restore, or by some application.

In the case of server duplication, a partition of a storage device of some server other than the computing system is preferably used as an image. The size of the partition image can be changed before or during restoration procedure, for example, resized to fit an actual size of a physical area of a disk on which it should be restored. Optimally, the image stays unchangeable until termination of the restoration process.

Various networks can be used for storing the image. For example, storage area networks, peer-to-peer networks, remote storage on a remote server, and virtual disk drives, such as network disk emulators, all can be used for storing the image.

The image can be created on at least one server that is connected to a network. Examples include a disk drive on a remote server, a network RAID array, storage area networks, or network streamers (magnetic or optical tape devices that requires serial, or streaming, data access). In the latter case, restoration of data that is not requested by applications is performed in the order in which the blocks are located on a particular magnetic tape. It should be noted that in the case of using a streamer, it is preferable to copy data onto a device with random access, since the use of a sequential access device significantly slows down execution of data requests from applications. An intermediate storage device may be used, together with the streamer, to speed up the restoration process.

Restoration of unaltered portions of the data (after the critical system data has been restored) can be done based on a pre-assigned priority of blocks of the image. Such assignment of priority of the blocks that have not been requested by the applications is generally a necessary and common-sense operation. However, in some cases, a particular prioritization scheme may increase the efficiency of the process. For example, the first data to be copied is data that is likely to be requested by the applications, or used by the operating system itself. Alternatively, or in addition to, this priority may be related to the physical nature of the devices. For example, blocks that belong to a single cylinder or sector can have a related priority.

In the description herein, the term "block" refers to any unit of information storage that is used by the operating system when addressing disk access requests to the hard drive, for example, a sector, a cluster or a file. Additionally, prior to starting the copying of the first block, it is preferable to create a bitmap of all the blocks that need to be copied to the restored disk. In the case of creating an incremental image, the bitmap should exclude blocks relating to deleted files.

It is also understood that rather than using a "regular" (or "standard") driver that includes standard operating system mechanisms for disk access, the present invention modifies some of these drivers or replaces some of these drivers with its own dedicated drivers.

Restored server identification and/or authentication data can be updated during the execution of the boot-up procedure. This is particularly necessary when portions of a disk drive are cloned while being used in the same system. The data being replaced can be, for example, UUID, URL, IP address, login, and/or password.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method of migrating a server, the method comprising:
creating a block-based image of a storage device of a first server, the image comprising a bitmap;
while the first server is hot-migrated on-the-fly and a second server is started during the hot-migration, executing a boot loader on the second server, and restoring, from the image, to the second server, those blocks of an operating system data that are needed to start the second server;
modifying parameters of the second server's operating system based on a hardware configuration of the second server, to enable interfacing to hardware of the second server;
using at least some of the image data as a local drive data of the second server;
running the second server using the image data, the restored blocks of the operating system data and the modified operating system parameters; and
while the second server is running, based on the bitmap, restoring unaltered portions of remaining data from the image.

2. The method of claim 1, when a snapshot of the first server is used as the image.

3. The method of claim 2, further comprising hibernation of the second server, wherein the snapshot further comprises a hiberfile of the first server.

4. The method of claim 1, wherein at least one of the second server identification and authentication data stored in the image is updated before the rebooting.

5. The method of claim 1, wherein updating of the operating system is performed using at least one driver substitution.

6. The method of claim 1, further comprising at least partially replacing identification data of the second server with corresponding data stored in the image.

7. The method of claim 1, wherein the restoring is performed over a network.

8. The method of claim 1, wherein the image is created on a computing system connected to the first server over a network.

9. The method of claim 1, wherein the image is created on any server in a network, including the first server.

10. The method of claim 1, wherein the second server is a virtual server.

11. The method of claim 1, wherein a remainder of the image is transferred gradually over time after the second server becomes operational.

12. The method of claim 1, wherein the restoration step uses an incremental image of the storage device.

13. The method of claim 1, wherein unused blocks and bad blocks are ignored when the image is created, and are not subsequently restored.

14. A method for improving system stability after failure of a main server, the method comprising:
creating a block-based backup of files of the main server and a corresponding bitmap;
after failure of the main server, repairing the main server;
restoring, from the backup, on a reserve server, operating system data;
updating parameters of an operating system of the reserve server to match a hardware configuration of the reserve server;
running the reserve server using the backup and the updated parameters;
after repairing the main server, hot-migrating contents of the reserve server to the main server, wherein the unaltered portions of remaining data from the image are restored based on marked sections of the bitmap; and
starting the main server during the hot migration process.

15. The method of claim 14, wherein content of the reserve server contains restored portion of the backed up data, altered portion of the backed up data and unrestored portion of the backed up data.

16. The method of claim 14, wherein the updating includes at least one driver substitution.

17. The method of claim 14, wherein the main server starts up after the restoration using online migration of the reserve server to the main server.

18. The method of claim 14, wherein the main server restoration uses any one of a plurality of restoration points.

19. The method of claim 14, wherein the main server restoration uses snapshot of the reserve server.

20. The method of claim 14, wherein the main server is restored from hiberfile of the reserve server.

* * * * *